May 11, 1937. M. A. SERRA 2,079,822
FRICTION CLUTCH FOR MOTOR CARS
Filed May 20, 1936 4 Sheets-Sheet 2
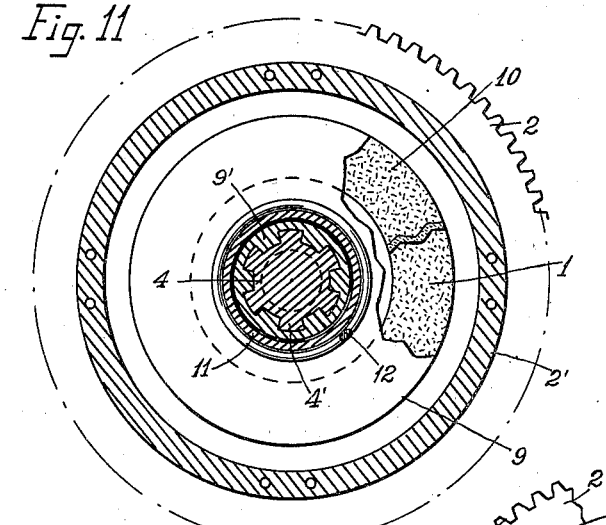
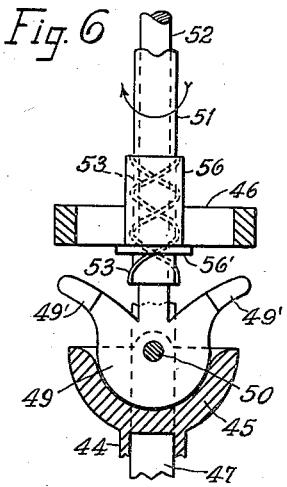
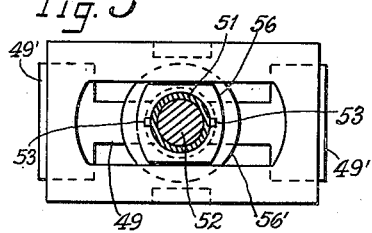
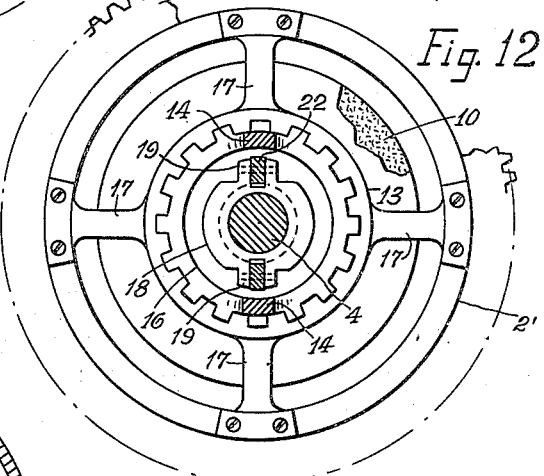
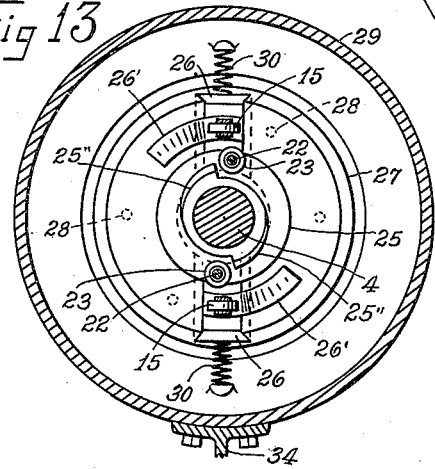
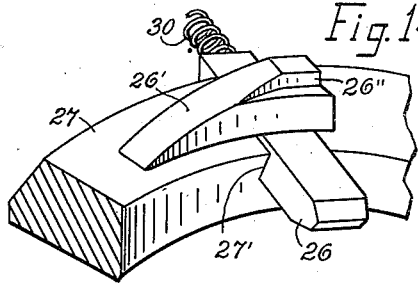

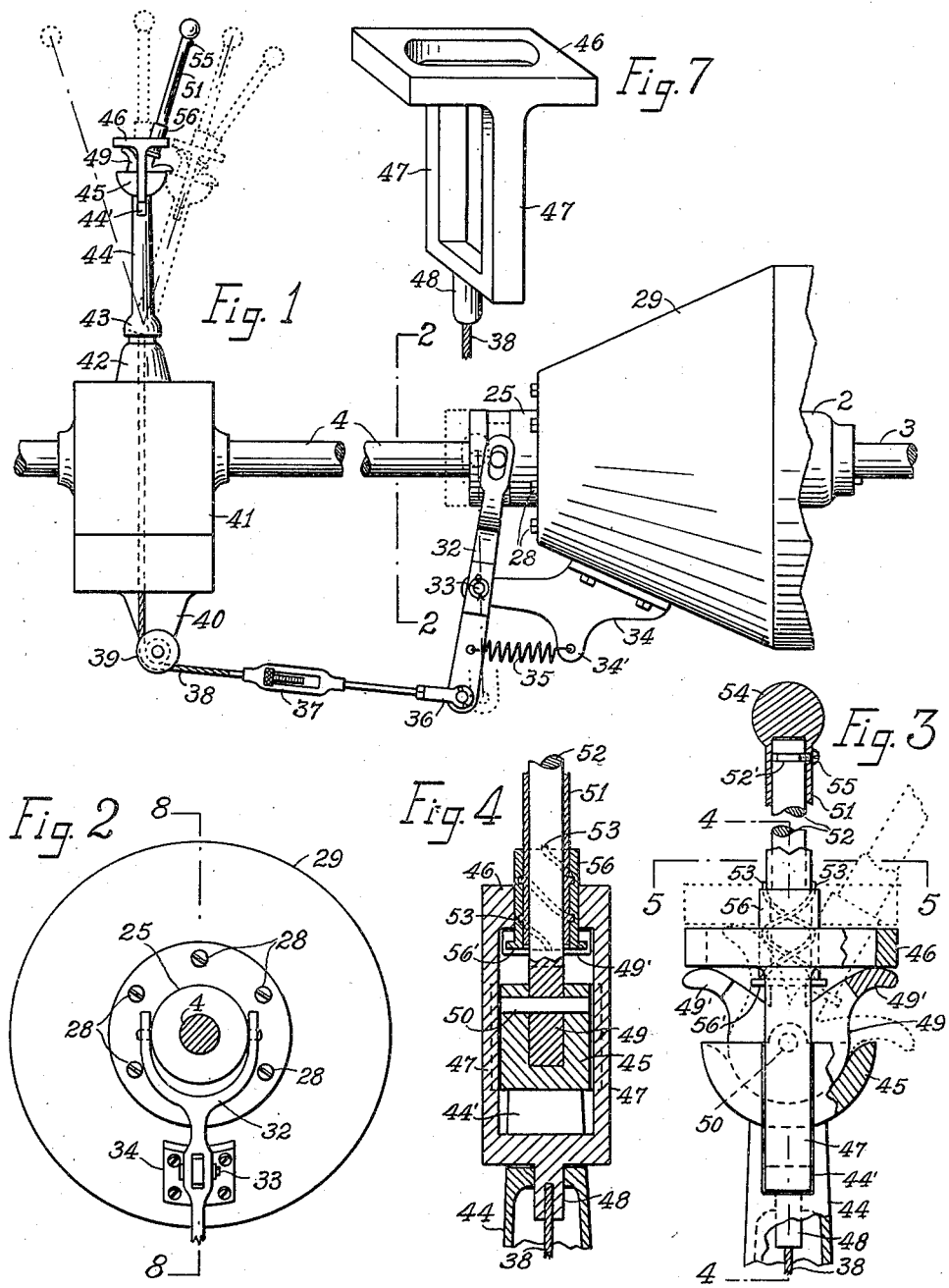

May 11, 1937.  M. A. SERRA  2,079,822
FRICTION CLUTCH FOR MOTOR CARS
Filed May 20, 1936 4 Sheets-Sheet 3
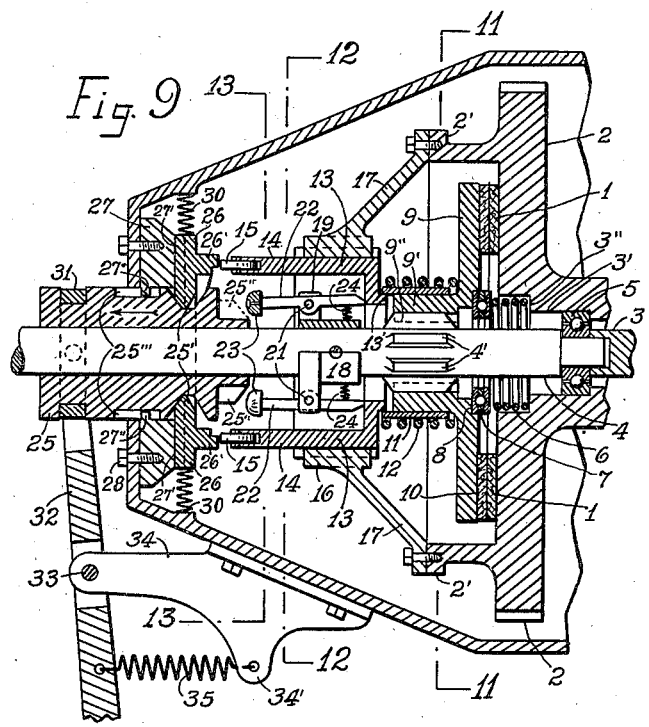
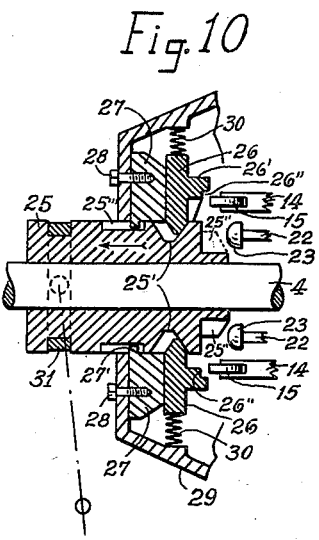
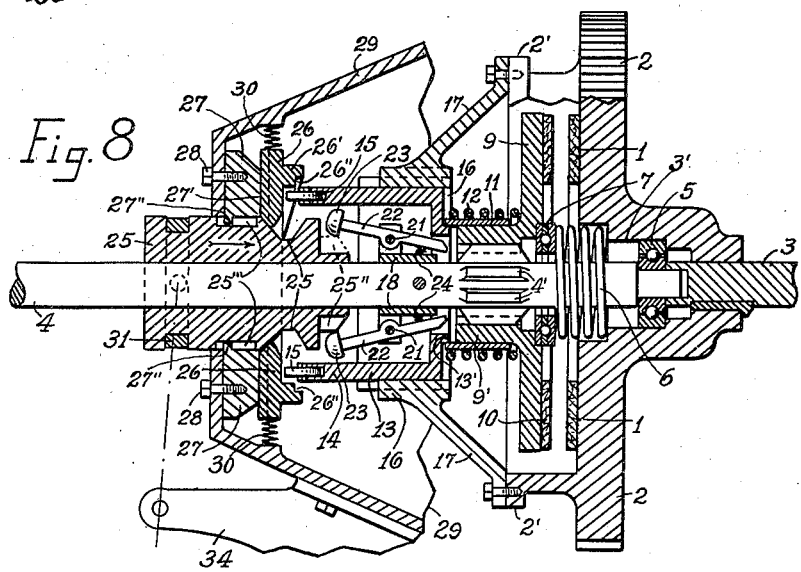

May 11, 1937.  M. A. SERRA  2,079,822
FRICTION CLUTCH FOR MOTOR CARS
Filed May 20, 1936    4 Sheets-Sheet 4
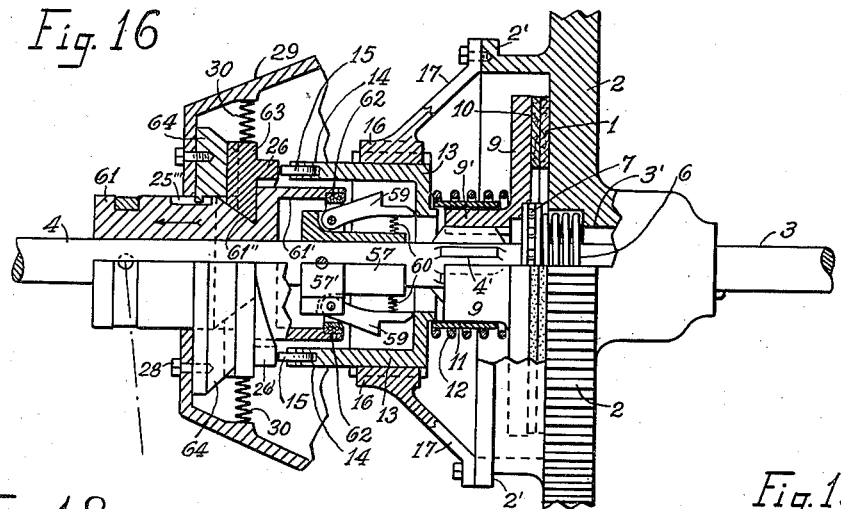
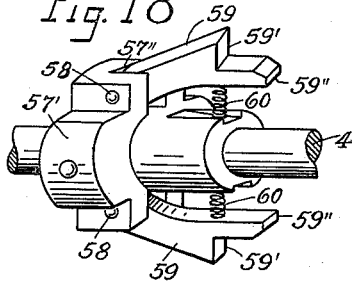
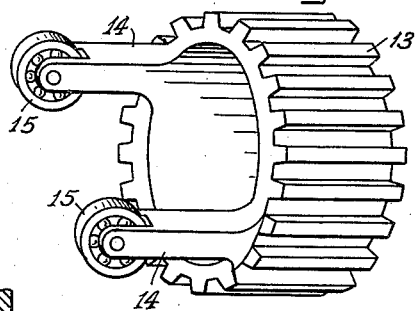
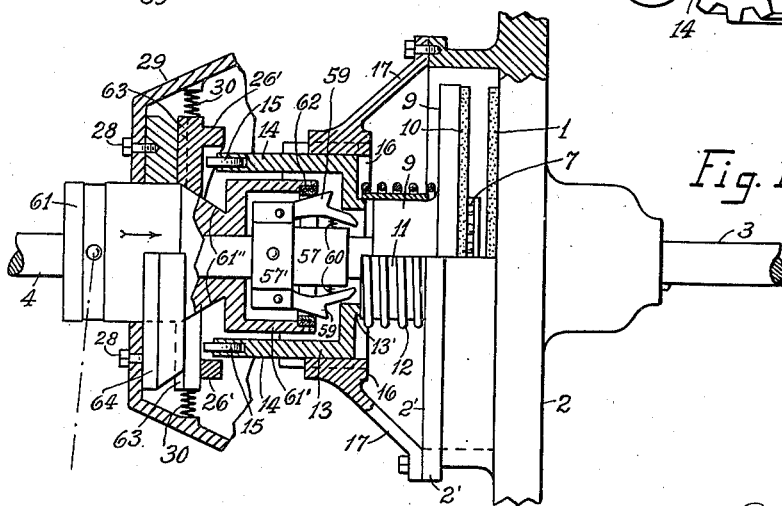
M. A. Serra
Inventor
By Glascock Downing & Seebold
Attys.

Patented May 11, 1937

2,079,822

UNITED STATES PATENT OFFICE 2,079,822

FRICTION CLUTCH FOR MOTOR CARS

Manuel Aurelio Serra, Habana, Cuba

Application May 20, 1936, Serial No. 80,866
In Cuba April 27, 1936

2 Claims. (Cl. 192—3.5)

This invention relates to clutches and more specifically to friction clutches suitable for motor cars.

An object of the invention is to provide a device by means of which the clutch pedal may be omitted and the engaging and disengaging made through the change speed lever. In other words, by means of this invention the engaging, disengaging and change of speed may be operated through a single lever, thus reducing many of the risks of accidents.

A further object of the invention is to provide a clutch of a smooth, noiseless and efficient operation which will transmit the maximum power of the engine without any loss of power caused by slipping; the device is very easily operated with the minimum effort of the driver; it imparts the maximum efficiency to the clutch springs since they act automatically and by the engine itself. Also no outside means are needed for operating said device.

A still further object of the invention is to provide means on the change speed lever, which also operates the clutch, for the permanent disengaging of the clutch at driver's will.

In the drawings:

Figure 1 is a side elevation in detail of the clutch and the device which operates same.

Figure 2 is a vertical section, in detail, according to line 2—2 of Figure 1.

Figure 3 is a partial sectional view, in detail, of the change speed lever which operates the clutch.

Figure 4 is an axial section, in detail, according to line 4—4 of Figure 3.

Figure 5 is a horizontal section, in detail, according to line 5—5 of Figure 3.

Figure 6 is a fragmentary sectional view of an operating position of the change speed lever, which also operates the clutch.

Figure 7 is a perspective view, in detail, showing one of the parts of the device which operates the clutch.

Figure 8 is a longitudinal vertical section according to line 8—8 of Figure 2.

Figure 9 shows in a similar section as of Figure 8 the clutching position of the device.

Figure 10 is a sectional view similar to Figs. 8 and 9, in detail, showing part of the clutch-holding device, in a pre-determined operating position.

Figure 11 is a transversal vertical section, according to line 11—11 of Figure 9.

Figure 12 is another transversal vertical section according to line 12—12 of Figure 9.

Figure 13 is also another transversal vertical section according to line 13—13 of Figure 9.

Figures 14 and 15 are partially perspective views, in detail, of essential parts of the clutch.

Figure 16 is a longitudinal sectional view, in detail, of a modified form of the invention.

Figure 17 shows in a similar section as of Figure 16 the operating position of the modified form of the clutch, and Figure 18 is a perspective view, in detail, of one of the essential parts of the modified form of the invention.

With reference to Figures 8 to 15 inclusive, numeral 1 indicates one of the clutch-friction disks, which, as usual, is fastened to fly-wheel 2, mounted on crankshaft 3 of the motor.

At the end of said crankshaft there is a recess for housing the trunnion of horizontal shaft 4 in alignment with shaft 3, which trunnion bears against a ball-bearing 5 seated in recess 3' in the hub of fly-wheel 2. Around shaft 4, spring 6 is wound. One end of said spring is housed in recess 3'' and its other end bears against ball-bearings 7, seated at 8 on plate 9.

Another clutch-friction disk 10 is fastened to plate 9 for cooperating with disk 1. Grooves 9'' of hub 9' on plate 9 are slidably engaged through corresponding ribs or lands 4' on shaft 4. A sleeve 11 is fitted on hub 9'. Spring 12 is wound around the sleeve and bears against grooved hub 13 as shown at Figs. 8, 9 and 15; said hub has a flange 13' against which bears the forward outer edge of sleeve 11.

The grooved hub 13 has two forked arms 14 integral therewith which support rollers 15; said hub being slidingly maintained along the grooves of a grooved ring 16 which has integral arms 17 attached by screws to annular rib 2' of the flywheel 2. Within hub 13 sleeve 18, provided with four ears 19, is fastened to shaft 4, said ears being positioned diametrically in pairs and between each two of them, is pivoted at 21, stop lever one end of which is beveled and its other end carries a roller 23. The levers 22 are forced together at their roller ends, through spring 24.

On shaft 4 is slidingly mounted a cylindrical slide or block 25, the inner end of which, in the engaging position, slightly projects inside the grooved hub 13. Said hub 13 shows neck 25' cooperating with two bolts 26 which normally have a sliding movement within guide grooves 27' on plate 27 fastened by bolts 28 to the narrower end of conical casing 29 which houses the clutch. Bolts 26 have formed cam-projections 26' of the shape shown at Figure 14 and angular recesses 26'' for purposes which henceforth will be explained. Bolts 26 are actuated by compression springs 30 fastened at their outer ends on projecting ears of the inner face of casing 29.

The rear end of slide 25 has a reduced part whereon are formed the projecting cams 25'', cooperating with the respective roller 23 of lever 22. Grooves 25''' in slide 25 are slidably engaged to teeth 27'' which integrally project from plate 27.

The forward part of slide 25 has an annular groove 31 adapted to engage the forked end of lever 32 pivoted at 33 to bracket 34 fastened to the lower part of casing 29. On ear 34' one end of spring 35 is fastened and the other end is fixed to lever 32.

Referring to Figures 1 to 7 of the drawings:

The lower end of lever 32 is pivoted to one end of rod 36 which is provided with stretcher 37 to which cable 38 is fastened, it being guided around pulley 39 on pulley case 40 on change speed casing 41.

Upon standards 42 projecting from the upper end of said change speed casing is pivoted a hollow post 44 through the intermediary of a joint 43, constituting an operating lever of the device of change speed of the vehicle. Said lever terminates with a semicircular socket 45 wherein lateral guides 45' are provided for the sliding member, shown in Figure 7, with a slotted, horizontal table top 46 and a depending loop 47 the sides of which engage in guides 45'. At the lower end of this loop 47 projects a stem 48, whereto one end of cable 38 is fastened and the lower end of loop 47 is slidably mounted through an opening in the upper part of lever 44 and under housing 45.

In socket 45 a rocker 49 is seated; said rocker has a cam 49' substantially I-shaped, as shown on Figure 5, projecting upwardly to engage under the horizontal table 46 in a predetermined position for working.

The rocker 49 is pivoted on a pin 50, to the sides of socket 45, and is integral with rod 52, which fits into pipe 51 forming the clutch handle of the clutching device; said clutch handle ending in head 54.

The upper end of the rod 52 has a shoulder 52' engaging set screw 55.

The lower part 53 of the tubular clutch handle 51 is threaded to the nut 56 which terminates in the ring-shaped flange 56'.

Having thus described the different parts of the object of this invention, its operation will be clearly understood, from the following:

Assuming that the parts have the position shown in Fig. 9, with the tubular clutch handle 51 in the raised position shown in dotted lines on Figure 1 and also in full lines in Figure 3, then the shifting of clutch handle 51 into the position shown in full lines in Figure 1, will be accomplished by moving it through the slot in frame 46, and together with said lever, the rocker 49 will oscillate around its pivot pin 50, and the projections of cam 49', which engage the horizontal table 46, will raise this table to the position shown in dotted lines in Figure 3, and in full lines in Figure 1.

The above operation will cause the pulling of cable 38, fastened to loop 47, for overcoming the pull of spring 35. Slide 25 will then slide along grooves 25''' guided by the teeth 27'' as indicated by the arrow in Fig. 8, actuated by the forked lever 32, when the bolts 26, against the action of their respective springs 30, will be forced out of neck 25'. Consequently, the rollers 15 will engage cam projection 26', and under the combined pressure of springs 6 and 12 the sliding movement of grooved slide 13 will be made along grooved-ring 16 towards hub 25, and cam surface 25'' by its engagement with rollers 23 of levers or arms 22, will cause the divergent movement of said rollers against the pressure of springs 24. Thus the rear ends of said levers or arms will be disengaged from the rear part of ring 13. Therefore, clutching disk 9 will be disengaged from disk 1, as shown in Figure 8.

This disengaging operation being accomplished, the operations required for the normal movement and change of speed of a vehicle will be done in the usual co-ordination, and levers 51 and 44 will operate in the several positions as shown in dotted lines in Figure 1.

Upon releasing the clutch handle 51, which is assumed to be in the position shown in dotted line in Figure 1, that is obliquely to lever 44 actuating the change of speed, spring 35 is released, and through its tension the cable will pull downward loop 47 with table 46, which will again come to bear on cam projections 49', as is shown in full lines in Figure 3. The working parts of the clutch will then be restored to the position shown in Figure 9.

Any vibration will be eliminated due to the engagement of roller 15 with cam 26', because of the reaction of the clutch movement shown in Fig. 9, so that bolts 26 will rise slightly, as shown in Fig. 10, and the rollers will be kept away from the cam projection 26', due to the recess 26''.

The shifting of the clutch handle 51 in the opposite direction to that described above, will also cause a similar operation of the clutching.

Should it be desired to leave the device in a fixed disengaging position, clutch handle 51 will be turned, and due to its slot 52' and set-screw 55 for rod 52, a movement of screw and nut will be made with respect to the hub 56, which will force table 46 upwards leaving it in the position shown in Figure 6. The clutching position will be restored by an inverse turning of the clutch handle 51.

In Figures 16, 17 and 18 a modified form of the invention is illustrated, and the same numerals are used to represent parts that are similar to the foregoing device.

Consequently, to shaft 4 a member shown in detail in Fig. 18 is fastened, comprising hub 57, which integrally includes block 57', and upon its upper and lower parts recesses 57'' are made, and in which at 58 levers 59 are pivoted which show at their free ends rectangular recesses 59', and beveled points 59''. Said levers are forced apart by the compression springs 60 and come to bear in the clutching position of disks 1 and 10 at the rear end of grooved hub 13.

To the same shaft 4 hub 61 is slidingly mounted, its inner end terminating with an enlarged cylindrical portion 61' having a recess carrying a ring-shaped ball-bearing race 62 which is in frictional engagement with levers 59. In the recess of the cylindrical portion is housed the block 57'.

Hub 61 shows a neck of angular section 61'' which cooperates with bolts 63 which are slidingly mounted on guides placed on plate 64, fastened at the bottom of cover or casing 29. The bolts 63 must be of the shape described and shown in Fig. 14 for the purpose of eliminating all cause of noise or vibration.

The operation of this device is substantially similar to the one already described for the above construction, with the exception that levers 59 come into engagement with ball-bearing 62, which forces them together, disconnecting hub 13 so that the members come into the position shown in Figure 17.

I claim:

1. A friction clutch for a motor having a fly-wheel, said clutch comprising a casing, a main shaft, a friction disk fixed on said fly-wheel and a plate having a hub non-revolubly but slidably mounted on said main shaft arranged in alignment with the axis of the fly-wheel, a second friction disk fixed on the plate in juxtaposition to said first disk, a ball-bearing for said plate, a spring wound around said shaft mounted between said ball-bearing and the fly-wheel adapted to hold the disks apart, a second spring wound around the hub of said plate, a second hub slidably mounted on the fly-wheel and provided with an annular flange, said second spring being mounted between said plate and said flange of the second hub to hold them apart, a sleeve fixed on said shaft within the second hub, pivoted levers on said sleeve having ends bevelled in one direction, springs tending to press said beveled ends against said flange of the second hub, the opposite ends of said levers carrying rollers, a slide-muff mounted to slide on the main shaft and having a narrow neck with a cam surface, spring-actuated radially directed bolts normally tending to engage in said neck, said bolts being slidably mounted in said clutch casing, cam elements projecting sideways from said radial bolts, rollers mounted on said second hub and adapted to engage with said cam elements, cam surfaces formed on the end of said neck of the slide-muff in cooperative connection with the rollers of the pivoted levers, a double-armed lever adapted to effect the engagement and disengagement of the disks through the intermediary of the movement of said slide-muff due to the cooperation of the radial bolts and of the rollers and beveled ends of the pivoted levers, the cam surfaces on the neck of the slide-muff and the flange of the second hub respectively; and hand-operated means for securing the clutch in inoperative position through the cooperation with said double-armed lever.

2. A friction clutch in accordance with claim 1 in which said hand-operated means comprises a housing, a hollow swivel post mounted on a ball joint at one end of the housing, the free end of said post terminating with a semi-circular socket, a rocker-rod hinged in said socket and provided with sideways projecting cam-horns adjacent its hinge end, a slotted table adapted to cooperate with said horns and slidably mounted on said post in axial direction thereof, a flexible connection between said table and said double-armed lever and guided through said housing and said post, the rocker-rod extending through the slot of the table, a tubular clutch handle embracing said rocker-rod and adapted to turn thereon, a nut having threaded engagement with the lower end of said clutch handle and provided with a flange for engaging said table to raise the same upon turning of said clutch handle in order to fix the clutch in released position; a closing spring acting on said double-armed lever to hold the same in position for closing the clutch; whereby, upon tilting said clutch handle out of axial alignment of said post the double-armed lever is thrown in opposition to the closing spring to release the clutch through the intermediary of said rod, horns, table, post and flexible connection.

MANUEL AURELIO SERRA.